United States Patent [19]
Rike

[11] 3,800,923
[45] Apr. 2, 1974

[54] DISC BRAKE CALIPER AND FRICTION PAD MOUNTING MEANS

[75] Inventor: Russell E. Rike, Bellbrook, Ohio

[73] Assignee: The Dayton Steel Foundry Co., Dayton, Ohio

[22] Filed: Feb. 14, 1972

[21] Appl. No.: 226,194

Related U.S. Application Data

[62] Division of Ser. No. 66,528, Aug. 24, 1970, abandoned.

[52] U.S. Cl. ............................................. 188/73.6
[51] Int. Cl. ............................................ F16d 65/02
[58] Field of Search .......................... 188/73.3, 73.6

[56] References Cited
UNITED STATES PATENTS
3,051,272   8/1962   Burnett ........................... 188/73.6
3,463,275   8/1969   Soltis, Jr. ......................... 188/73.6
3,602,328   8/1971   Fannin et al. .................... 188/73.6

Primary Examiner—George E. A. Halvosa
Attorney, Agent, or Firm—Biebel, French & Bugg

[57] ABSTRACT

A disc brake employs a one-piece caliper which is open at the top and at the back to receive a boring tool for finishing the hydraulic cylinder. The cylinder cavity is formed with a piston supporting and sealing surface adjacent the open end and with an unfinished counter bore of substantial depth. A slot is formed in the caliper housing through which the backing plates may be removed inwardly through the caliper housing for replacement.

2 Claims, 4 Drawing Figures

PATENTED APR 2 1974 3,800,923
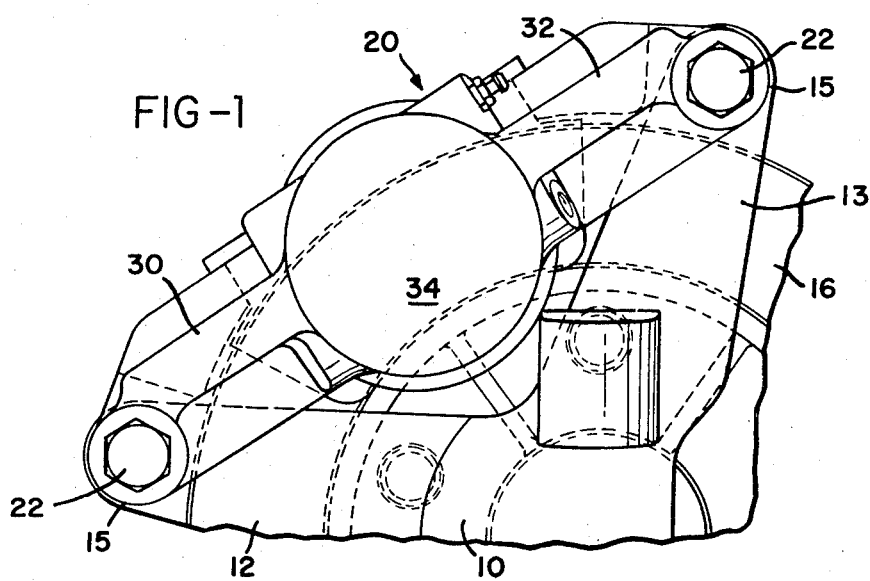
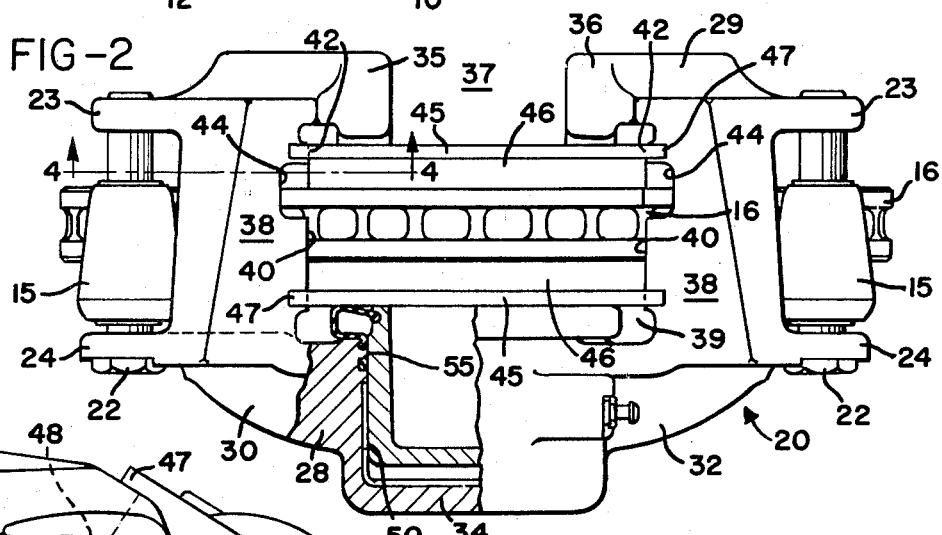
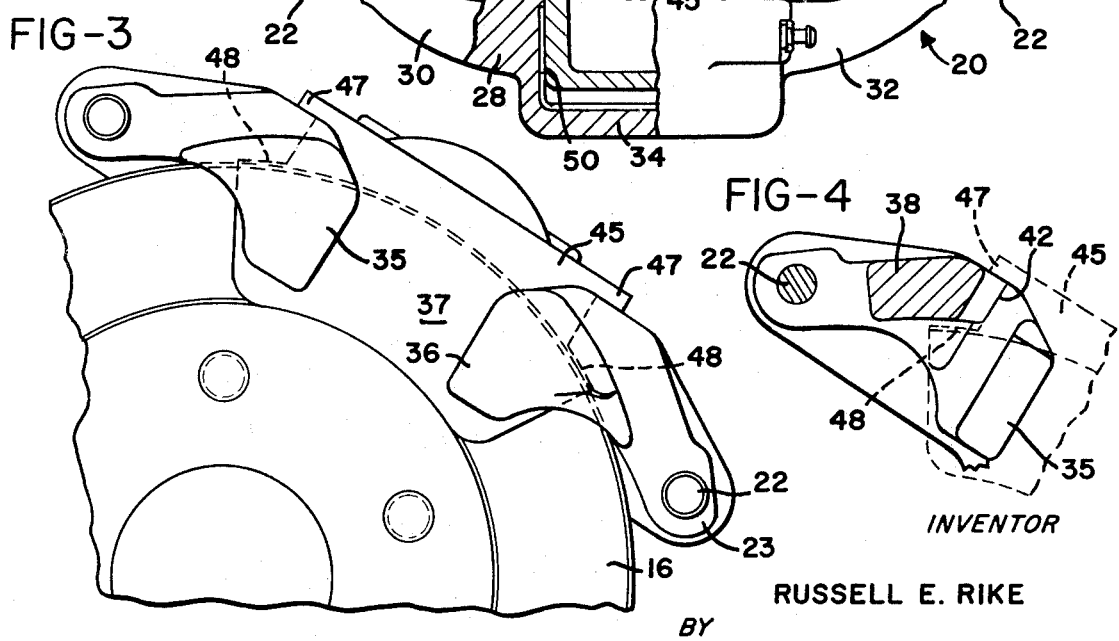
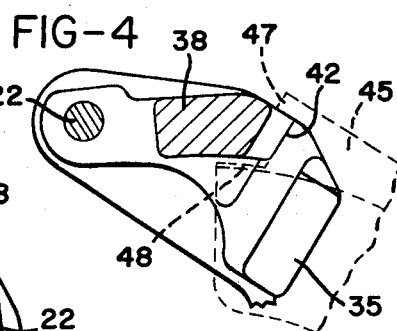
INVENTOR
RUSSELL E. RIKE
BY
Marechal, Biebel, French & Bugg
ATTORNEYS

DISC BRAKE CALIPER AND FRICTION PAD MOUNTING MEANS

CROSS-REFERENCE TO RELATED APPLICATION

This is a division of copending U.S. application Ser. No. 66,528, filed Aug. 24, 1970, entitled "DISC BRAKE" now abandoned.

BACKGROUND OF THE INVENTION

The invention relates to caliper type disc brakes in which a caliper housing is mounted on torque arms for self-aligning movement. A piston unit is positioned on one side of the caliper housing with a bore which opens inwardly toward the disc.

In the U.S. Pat. of Walther et al., No. 3,384,203, assigned to the same assignee as this application, there is shown a disc brake of the type identified above in which the piston unit is formed as a sub-assembly attached to the caliper housing. The separate piston assembly is accordingly machined prior to attachment to the caliper housing, and thus involves the additional expense of handling and the additional parts which are required to join the sub-assembly with the caliper. It is common in disc brakes to employ a cylinder-bore which is finished or machined substantially throughout the depth. Further, in open top calipers, the pads are commonly replaced through the top, and clips or retainer pins are used to hold the linings in place.

SUMMARY OF THE INVENTION

The present invention is directed to a disc brake and more particularly to a caliper construction for such a brake. One feature comprises the fact that the caliper is formed as a single unitary member. In the caliper housing of the present invention, the hydraulic cylinder bore is formed as an integral part of the caliper housing. The reaction side of the housing is formed with means defining an aperture or opening through which the casting is bored for the purpose of forming the hydraulic cylinder.

The cylinder bore of the invention is defined in part by an outer machined surface which forms the support for the piston and at which the piston is sealed, and an axial inner counter bore of greater diameter than the machined surface. In this manner, a major portion of the cylinder bore need not be machined since only the portion which is adjacent to the cylinder opening need be formed as a machined surface. This reduces the time required to finish the cylinder bore and further reduces the length of the tool or the extent of tool movement which is necessary to bore the cylinder. Where the entire depth of the cylinder bore must be machined, a substantially larger clearance opening must be provided within the caliper for the tool and tool movements than is required by the arrangement of the present invention.

The caliper of the present invention is preferably open at the top and of symmetrical design so that the bending forces are distributed through the center of the cylinder. Further provision is included for directly supporting the backing plates on the caliper housing and for the insertion and removal of those plates through the bottom of the housing without the necessity of providing an auxiliary clip or pad retaining device.

It is accordingly an important object of this invention to provide a disc brake having a one-piece caliper housing.

A further object of the invention is the provision of a hydraulic actuator in which only the portion of the cylinder bore which is adjacent the opening is machined and forms a sealing and supporting surface for the piston, and in which the axially inner portions define an unmachined counter bore of greater diameter than that of the machined surface.

Another object of the invention is the provision of a caliper housing for disc brakes in which there is provided an access or opening in the reaction side of the caliper for the purpose of machining the cylinder bore in the pressure side.

A further object of the invention is the provision of an open top caliper for a disc brake in which the backing plates are retained and providing for ease of removal and replacement of these plates and pads without the necessity of providing pad retaining clips.

Other objects and advantages of the invention will be apparent from the following description, the accompanying drawings and the appended claims.

BRIEF DESCRIPTION OF THE DRAWINGS

FIG. 1 is an end elevation of the disc brake looking at the inboard side;

FIG. 2 is a plan view partially in section;

FIG. 3 is an elevational view looking at the reaction side; and

FIG. 4 is a section taken generally along the line 4—4 of FIG. 2.

DESCRIPTION OF PREFERRED EMBODIMENT

Referring to the figures of the drawing which illustrates a preferred embodiment of the invention, a disc brake assembly is shown in FIG. 1 as including a relatively rigid or fixed torque member 10. The torque member is formed with a pair of generally radially outwardly spaced torque arms 12 and 13 which terminate in inwardly turned ends 15 radially outwardly of the periphery of the disc 16. The general arrangement of the torque member and arms and the arrangement for supporting the caliper housing is substantially as shown in U.S. Pat. No. 3,384,203.

A one-piece cast caliper housing indicated generally at 20 is supported for axial movement on the arms 12 and 13 by means of a pair of pins or bolts 22. The bolts 22 are supported on ears 23 and 24, and are received through an opening in the ear 23 and threaded into the opposite ear 24. The bolts 22 extend through corresponding aligned openings formed in the arm ends 15. The ends 15 may be suitably provided with low friction bushings such as those shown in U.S. Pat. No. 3,384,203. Preferably, however, elastomeric bushings are employed as shown in Walther, U.S. Pat. No. 3,482,655.

The caliper 20 is formed as a single unitary casting and includes a pressure side 28 and a reaction side 29. The pressure side 28 is formed with a pair of integral generally chordwise extending ribs 30 and 32 leading into a central enlarged portion forming a cylinder housing 34. The reaction side of the housing comprises a pair of reaction arms 35 and 36, the ends of which generally lie along a corresponding chord line on the opposite side of the disc 16. The arms 35 and 36 define an open space 37 therebetween. Knuckles or connecting webs 38 extend integrally between the pressure and reaction parts at spaced apart locations radially outwardly of the disc. The webs 38 are arcuately spaced and defined therebetween a central opening or space 39.

The knuckles 38 are each formed with an axially spaced pair of flat machined torque-receiving surfaces 40 and 42 facing inwardly toward the open center section, and separated by a cutout or slot 44. The surfaces 40 and 42 define abutments for the backing plates 45 which, in turn, support friction pads 46. The plates 45 are identical in construction and include upper overlying lips 47 and lower underlying ledges 48 at each end thereof. The lips bear or rest on the top surfaces of the knuckles 38 while the ledges 48 are received adjacent to the bottom surfaces 49, as shown in FIG. 4. The abutment surface 40 is axially longer than the corresponding surface 42 to provide for adjusting movement of the associated plate 45 as the lining wears. No such provision for adjusting movement is required with respect to the plate 45 on the reaction side of the caliper.

The arcuate space defined by the opposite slots 44 is greater than the width of the backing plates 45 measured chordwise from lip to lip. Thus, in replacing the linings, it is only necessary to remove one of the bolts 22 and pivot the housing 20 on the opposite bolt away from the disc 16. At this point, each of the backing plates 45 may be moved into the region of the slots 44 and then removed inwardly through the housing. In like manner, new backing plates and pads may be inserted through the slots 44, and the caliper repositioned over the disc and the bolt 22 reinserted. The arrangement for retaining the backing plates is thus one in which there are no retaining clips or accessories required. While the clearance means comprising the slots 44 is shown as being found at each arcuate side of the opening 39, in each knuckle 38, it is within the scope of the invention to form a clearance slot 44 in one knuckle only for the purpose of inserting and removing the backing plates.

The one-piece caliper 20 of this invention further provides means by which the cylinder bore may be machined. For this purpose, the cylinder bore is preferably cored while casting to form an inside portion 50 which has a greater diameter than a portion 55 adjacent the opening. A suitable boring tool may thus be inserted in the space 37 formed between the ends 35 and 36 for machining a surface on the front portion 55. The surface which must thus be machined is of a length measured axially which is less than the full depth of the cylinder bore, and may form a minor portion of the total depth of the cylinder, as shown. This makes possible a substantial reduction in machining time. Also since the axial tool movement necessary to machine only part of the bore is less than that which would otherwise be necessary to machine a full bore, less open space is required in the cavity or opening 39 for finishing the caliper housing. Also, while the space between the arms 35 and 36 may correspond to the diameter of the machined portion 55 of the bore, it is within the scope of the invention to machine a bore which is of a greater diameter merely by bringing the shank of the boring tool laterally into position through the space 39 with the boring tool carried on the end.

It has been found that a cylinder with a machined surface 55 which forms only a minor portion of the tool depth of the cylinder bore provides adequate support for the piston 60. The seal 62 is received within the usual slot or recesses, formed in the cylinder portion 55. However, it is within the scope of the invention to form the portion 55 as a greater or even a major portion of the total depth of the cylinder.

The provision of the caliper housing in which the reaction arms 29 lie generally along a chord line opposite to that of the arm 30 and 32 provides a caliper housing of exceptional strength and resistance to deflection. The provision of a cylinder housing 34 which is formed with an oversized opening and a machined working land or surface adjacent the open end of the cylinder provides an arrangement which substantially reduces the machining time for forming the cylinder. It has been found that a cylindrical surface of relatively smaller depth is required to support the piston.

The provision of a caliper housing with opposite spaced abutment surfaces together with a relieved portion therebetween provides for ease of removal and replacement by sliding the backing plates axially when the housing is removed or depressed away from the disc, accompanied by a movement inward of the caliper housing for extracting and replacing the plates. The inward movement permits the cutout 44 to be made of only a relatively small axial dimension as compared to that which would be required if the plates were to be removed radially outwardly of the caliper.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A caliper-type disc brake including a caliper housing removably mounted on torque arms and having arcuately spaced, axially extending crossover portions defining an open top therebetween and supporting a pair of friction pads and backing plates on opposite sides of the disc, the improvement comprising means defining a first pair of arcuately spaced-apart plate-engaging surfaces on said crossover portions positioned on one axial side of the disc to receive the torque from one of said plates, means defining a second pair of corresponding arcuately spaced-apart plate-engaging surfaces on said crossover portions positioned generally at the opposite axial side of the disc to receive the torque from the other of said backing plates, each of said backing plates being provided with opposite surface engaging means and having tabs proportioned to overlie said crossover portions and exclusively supporting the associated plates against inward movement, the friction pads on said plates being received in underlying relation to said crossover portions and formed with an arcuate length which exceeds the arcuate length of said tabs, and means in at least one of said crossover portions defining a slot axially between an adjacent pair of said surfaces proportioned to provide clearance for the radially inward movement only of said friction pads when said housing is moved away from said disc permitting the removal and replacement of the plates inwardly thereof through said housing.

2. The brake of claim 1 further comprising a means defining an arcuately opposite pair of said slots one in each of said crossover portions, the arcuate spacing between said slots being less than the width of said pads and greater than the width of said tabs providing clearance for the radial inward removal and replacement of the plates through the housing.

* * * * *